(12) United States Patent
Li

(10) Patent No.: US 10,922,422 B2
(45) Date of Patent: Feb. 16, 2021

(54) BLOCKCHAIN-BASED IMAGE PROCESSING METHOD AND APPARATUS

(71) Applicant: ADVANCED NEW TECHNOLOGIES CO., LTD., Grand Cayman (KY)

(72) Inventor: Zhiguo Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/866,378

(22) Filed: May 4, 2020

(65) Prior Publication Data

US 2020/0265147 A1  Aug. 20, 2020

Related U.S. Application Data

(63) Continuation of application No. PCT/CN2020/070881, filed on Jan. 8, 2020.

(30) Foreign Application Priority Data

May 13, 2019 (CN) .......................... 2019 1 0395779

(51) Int. Cl.
*H04L 29/06* (2006.01)
*G06F 21/60* (2013.01)
*G06F 21/16* (2013.01)

(52) U.S. Cl.
CPC ............ *G06F 21/602* (2013.01); *G06F 21/16* (2013.01); *G06F 2221/0733* (2013.01)

(58) Field of Classification Search
CPC . G06F 21/602; G06F 21/16; G06F 2221/0733
See application file for complete search history.

(56) References Cited

U.S. PATENT DOCUMENTS

| 8,571,993 B2 | 10/2013 | Kocher et al. |
| 9,430,140 B2 | 8/2016 | Reuschel et al. |

(Continued)

FOREIGN PATENT DOCUMENTS

| CN | 103428503 A | 12/2013 |
| CN | 103761488 A | 4/2014 |

(Continued)

OTHER PUBLICATIONS

Pathak, Anuj Kr. Image Integrity Analysis with BlockChain Technology. Diss. Indian Institute of Information Technology, 2019. (Year: 2019).*

(Continued)

*Primary Examiner* — Shawnchoy Rahman

(57) ABSTRACT

Methods, systems, and apparatus, including computer programs encoded on computer storage media, for blockchain-based image processing are provided. One of the methods comprises: obtaining, by a computing device, copyright-related information corresponding to an original image; sending, by the computing device, the copyright-related information to one or more blockchain nodes configured to obtain ciphertext information by encrypting the copyright-related information and to store the ciphertext information in the blockchain; obtaining, by the computing device, the ciphertext information from the blockchain; and performing, by the computing device, obfuscation on a pixel matrix of the original image based on the ciphertext information to generate a target image carrying the copyright-related information.

15 Claims, 9 Drawing Sheets

(56) References Cited

U.S. PATENT DOCUMENTS

| | | | |
|---|---|---|---|
| 10,264,041 B2 | 4/2019 | Bologh | |
| 10,645,180 B1 | 5/2020 | Batey et al. | |
| 2014/0025952 A1* | 1/2014 | Marlow | H04L 63/0428 713/168 |
| 2016/0188893 A1* | 6/2016 | Ghafourifar | G06F 21/6227 713/189 |
| 2016/0283920 A1 | 9/2016 | Fisher et al. | |
| 2017/0116693 A1 | 4/2017 | Rae et al. | |
| 2017/0206523 A1 | 7/2017 | Goeringer et al. | |
| 2018/0068091 A1* | 3/2018 | Gaidar | G06F 21/10 |
| 2018/0343110 A1 | 11/2018 | Funk | |
| 2019/0294761 A1 | 9/2019 | Kim et al. | |
| 2019/0361867 A1 | 11/2019 | Nilsson et al. | |
| 2020/0034792 A1 | 1/2020 | Rogers et al. | |

FOREIGN PATENT DOCUMENTS

| | | | |
|---|---|---|---|
| CN | 106250721 A | | 12/2016 |
| CN | 106682457 A | | 5/2017 |
| CN | 106997388 A | | 8/2017 |
| CN | 107330338 A | | 11/2017 |
| CN | 107798650 A | | 3/2018 |
| CN | 109063426 A | | 12/2018 |
| CN | 109145632 A | | 1/2019 |
| CN | 109492351 A | | 3/2019 |
| CN | 109614775 A | | 4/2019 |
| CN | 109711120 A | | 5/2019 |
| CN | 109767375 A | * | 5/2019 |
| CN | 110263505 A | | 9/2019 |
| EP | 3605370 A2 | | 2/2020 |
| WO | 2019141293 A2 | | 7/2019 |

OTHER PUBLICATIONS

Obimbo, Charlie, and Behzad Salami. "DIGICOP: A Copyright protection algorithm for Digital Images." 2009 IEEE Toronto International Conference Science and Technology for Humanity (TIC-STH). IEEE, 2009. (Year: 2009).*

Liu et al.. "Anti-fake image identifying and generating method, involves generating hidden information of particular image, and embedding hidden information into carrier image to generate anti-fake label, dividing particular image into R-pixel matrix." CN 109523451 A, Oct. 18, 2018 (Year: 2018).*

First Search dated May 20, 2020, issued in related Chinese Application No. 201910395779.4 (2 pages).

First Office Action dated May 28, 2020, issued in related Chinese Application No. 201910395779.4, with English machine translation (23 pages).

Written Opinion and International Search Report for PCT Application No. PCT/CN2020/070881 made available to public on Nov. 19, 2020.

* cited by examiner

| | | | | | | | | | | | | | |
|---|---|---|---|---|---|---|---|---|---|---|---|---|---|
| 1 | [0] | 1 | [1] | 0 | 0 | 1 | 0 | [1] | 1 | [0] | 1 | 0 | 1 |
| 1 | 0 | 1 | 0 | 1 | 0 | 0 | 1 | 1 | 1 | | | | |
| 0 | 1 | 0 | 1 | 1 | 0 | 1 | 0 | 1 | 1 | | | | |
| 1 | 1 | 1 | 0 | 0 | 1 | 1 | 1 | 0 | 1 | | | | |
| 0 | [0] | 1 | [1] | 1 | 0 | 1 | 1 | [1] | 0 | [1] | 0 | 1 | 1 |
| 0 | 1 | 1 | 1 | 0 | 1 | 0 | 1 | 1 | 0 | | | | |
| 1 | 0 | 1 | 0 | 1 | 0 | 1 | 0 | 1 | 1 | | | | |
| 0 | 1 | 0 | 1 | 0 | 1 | 0 | 1 | 0 | 1 | | | | |

FIG. 3(e)

BLOCKCHAIN-BASED IMAGE PROCESSING METHOD AND APPARATUS

CROSS-REFERENCE TO RELATED APPLICATION

This application is a continuation application of International Patent Application No. PCT/CN2020/070881, filed with the China National Intellectual Property Administration (CNIPA) on Jan. 8, 2020, which is based on and claims priority to and benefit of Chinese Patent Application No. 201910395779.4, filed with the CNIPA on May 13, 2019. The entire contents of all of the above-identified applications are incorporated herein by reference.

TECHNICAL FIELD

The specification relates to the technical field of blockchains, and in particular, to a blockchain-based image processing method, system, storage medium, and apparatus.

BACKGROUND

With the rapid development of computer and Internet technologies, it becomes increasingly more convenient for people to obtain various information. As a result, however, it also becomes extremely convenient for people to freely plagiarize and disseminate other people's creation without consent of authors. For example, people freely plagiarize an original image by a user on a website, which leads to infringement of the image copyright of the user.

Therefore, there is a need for a reliable solution to protect the copyright of images created by a user.

SUMMARY

The embodiments of the specification provide a blockchain-based image processing method, system, storage medium, and apparatus. Obfuscation is performed on a pixel matrix of an original image based on copyright-related information of the original image, to generate a target image that carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

To solve the above-described technical problems, the embodiments of the specification are implemented as follows.

The embodiments of the specification provide a blockchain-based image processing method, comprising: obtaining copyright-related information corresponding to an original image, wherein the copyright-related information comprises copyright owner information; publishing the copyright-related information to a blockchain, so that a node device in the blockchain encrypts the copyright-related information to obtain ciphertext information corresponding to the copyright-related information; obtaining the ciphertext information from the blockchain; and performing obfuscation, based on the ciphertext information, a pixel matrix of the original image to generate a target image carrying the copyright-related information.

The embodiments of the specification further provide a blockchain-based image processing apparatus, comprising: a first obtaining module configured to obtain copyright-related information corresponding to an original image, wherein the copyright-related information comprises copyright owner information; a publishing module configured to publish the copyright-related information to a blockchain, so that a node device in the blockchain encrypts the copyright-related information to obtain ciphertext information corresponding to the copyright-related information; a second obtaining module configured to obtain the ciphertext information from the blockchain; and a processing module configured to obfuscate, based on the ciphertext information, a pixel matrix of the original image to generate a target image carrying the copyright-related information.

The embodiments of the specification further provide a blockchain-based image processing device, comprising: a processor, and a memory configured to store a computer executable instruction, wherein the executable instruction, when being executed, causes the processor to: obtain copyright-related information corresponding to an original image, wherein the copyright-related information comprises copyright owner information; publish the copyright-related information to a blockchain, so that a node device in the blockchain encrypts the copyright-related information to obtain ciphertext information corresponding to the copyright-related information; obtain the ciphertext information from the blockchain; and obfuscate, based on the ciphertext information, a pixel matrix of the original image to generate a target image carrying the copyright-related information.

The embodiments of the specification further provide a storage medium configured to store a computer executable instruction, wherein the executable instruction, when being executed, implements the following process of: obtaining copyright-related information corresponding to an original image, wherein the copyright-related information comprises copyright owner information; publishing the copyright-related information to a blockchain, so that a node device in the blockchain encrypts the copyright-related information to obtain ciphertext information corresponding to the copyright-related information; obtaining the ciphertext information from the blockchain; and performing obfuscation, based on the ciphertext information, on a pixel matrix of the original image to generate a target image carrying the copyright-related information.

According to some embodiments, the specification provides a method for blockchain-based image processing. The method comprises: obtaining, by a computing device, copyright-related information corresponding to an original image; sending, by the computing device, the copyright-related information to one or more blockchain nodes configured to obtain ciphertext information by encrypting the copyright-related information and to store the ciphertext information in the blockchain; obtaining, by the computing device, the ciphertext information from the blockchain; and performing, by the computing device, obfuscation on a pixel matrix of the original image based on the ciphertext information to generate a target image carrying the copyright-related information.

According to some embodiments, the specification provides a system for blockchain-based image processing. The system comprises: a processor and a non-transitory computer-readable storage medium storing instructions executable by the processor to cause the system to perform operations. The operations include: obtaining, by a computing device, copyright-related information corresponding to an original image; sending, by the computing device, the copyright-related information to one or more blockchain nodes configured to obtain ciphertext information by encrypting the copyright-related information and to store the ciphertext information in the blockchain; obtaining, by the computing device, the ciphertext information from the blockchain; and performing, by the computing device, obfuscation on a pixel matrix of the original image based on the ciphertext information to generate a target image carrying the copyright-related information.

According to some embodiments, the specification provides a non-transitory computer-readable storage medium for blockchain-based image processing. The storage medium is configured with instructions executable by one or more processors to cause the one or more processors to perform operations. The operations include: obtaining, by a computing device, copyright-related information corresponding to an original image; sending, by the computing device, the copyright-related information to one or more blockchain nodes configured to obtain ciphertext information by encrypting the copyright-related information and to store the ciphertext information in the blockchain; obtaining, by the computing device, the ciphertext information from the blockchain; and performing, by the computing device, obfuscation on a pixel matrix of the original image based on the ciphertext information to generate a target image carrying the copyright-related information.

In an embodiment, the performing obfuscation on a pixel matrix of the original image based on the ciphertext information comprises encoding the ciphertext information to obtain a binary string corresponding to the ciphertext information, and inserting the binary string into the pixel matrix.

In an embodiment, the inserting the binary string into the pixel matrix comprises: inserting at least one character of the binary string into the pixel matrix according to a set character spacing; dividing the pixel matrix into a plurality of pixel regions according to a set dividing rule, and inserting the binary string into at least one of the pixel regions; or dividing the pixel matrix into a plurality of pixel regions according to a set dividing rule, and inserting a portion of the binary string into each of the pixel regions.

In an embodiment, the performing obfuscation on a pixel matrix of the original image based on the ciphertext information comprises: encoding the ciphertext information to obtain a binary string corresponding to the ciphertext information; and using the binary string to replace redundant pixels in the pixel matrix according to a set replacing rule.

In an embodiment, the method further comprises: recording process information of performing obfuscation on the pixel matrix; and sending the process information to the one or more blockchain nodes for storing in the blockchain.

In an embodiment, the copyright-related information further comprises: current time information; current geographic location information; or identification information of the computing device.

In an embodiment, the copyright owner information comprises: a name of the copyright owner; or an ID number of the copyright owner.

The technical solutions of the embodiments obfuscate on a pixel matrix of an original image based on copyright-related information of the original image, so that a generated target image carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

BRIEF DESCRIPTION OF THE DRAWINGS

To more clearly describe the technical solutions of the embodiments of the specification or of the current technologies, the accompanying drawings to be used in the description of the embodiments or the current technologies will be briefly described below. The accompanying drawings in the description below are merely some of the embodiments of the specification. Other drawings may be obtained by one of ordinary skill in the art without creative effort according to these accompanying drawings.

FIG. 3(b) is a first diagram of the pixel matrix after insertion of a binary string corresponding to copyright-related information in the blockchain-based image processing method according to some embodiments of the specification.

FIG. 3(c) is a diagram of dividing the pixel matrix of the original image into a plurality of pixel regions in the blockchain-based image processing method according to some embodiments of the specification.

FIG. 3(d) is a second diagram of the pixel matrix after insertion of the binary string corresponding to the copyright-related information in the blockchain-based image processing method according to some embodiments of the specification.

FIG. 3(e) is a third diagram of the pixel matrix after insertion of the binary string corresponding to the copyright-related information in the blockchain-based image processing method according to some embodiments of the specification.

DETAILED DESCRIPTION

To enable those skilled in the art to better understand the technical solutions of the specification, the technical solutions of the embodiments of the specification will be completely and thoroughly described below with reference to the accompanying drawings in the embodiments of the specification. The described embodiments are merely some, but not all, embodiments of the specification. All other embodiments obtained, based on some embodiments of the specification, by one of ordinary skill in the art without creative effort shall fall within the protection scope of the specification.

The concept of the embodiments of the specification is that a pixel matrix of an image is obfuscated based on copyright-related information of the image, so that the copyright-related information of the image is embedded into the pixel matrix of the image, thereby protecting the copyright of the image. Moreover, when the pixel matrix of the image is obfuscated, the copyright-related information of the image is encrypted into a blockchain, and the pixel matrix is obfuscated using the obtained ciphertext information, thereby further improving the security of the image copyright due to the immutability of the blockchain. On the basis of this, the embodiments of the specification provide a blockchain-based image processing method, apparatus, device, system, and storage medium.

The method according to the embodiments of the specification may be applied to a terminal device, such as a cell phone, a computer, a computing device, and the like. Namely, the execution entity of the method may be a terminal device. For example, may be a blockchain-based image processing apparatus installed on the terminal device.

Figure 1:
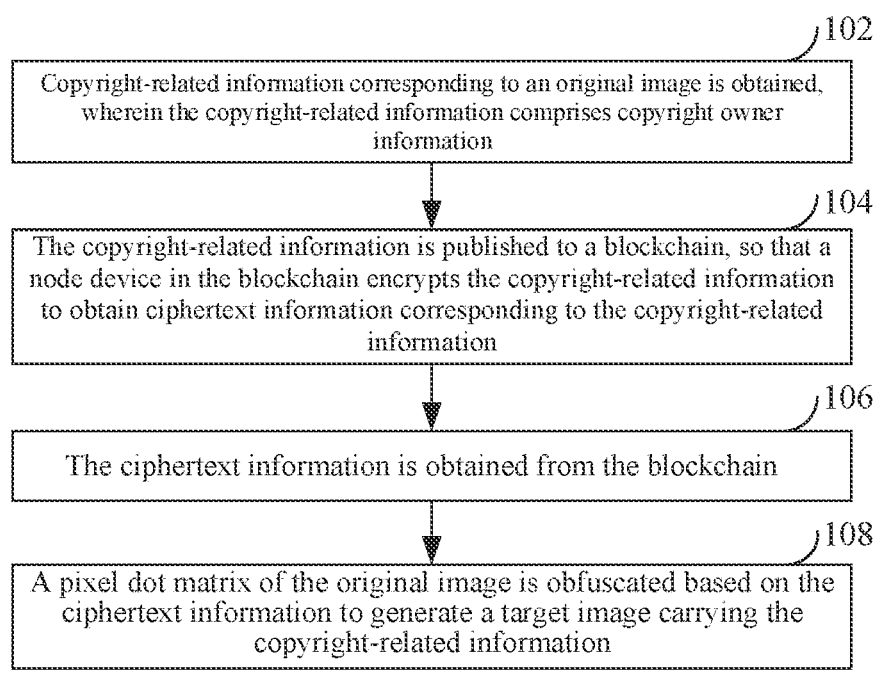
FIG. 1 is a first flow chart of a blockchain-based image processing method according to some embodiments of the specification.

FIG. 1 is a first flow chart of the blockchain-based image processing method according to some embodiments of the specification. The method shown in FIG. 1 at least comprises the following steps.

In Step 102, copyright-related information corresponding to an original image is obtained, wherein the copyright-related information comprises copyright owner information.

Herein, the copyright owner may be a creator of the original image or may be an authorized user or owner of the original image.

The copyright owner information may comprise a name of the copyright owner and an ID number of the copyright owner. In an embodiment, information of the copyright owner, such as address information, gender, age, and the like, may also be included, as long as the copyright owner information comprises the information capable of uniquely identifying a copyright owner. The copyright owner information may comprise other suitable information.

In Step 104, the copyright-related information is sent to a blockchain, so that one or more node devices in the blockchain can encrypt the copyright-related information to obtain ciphertext information corresponding to the copyright-related information and store the ciphertext information to the blockchain. This process of sending the copyright-related information to blockchain nodes for storing in the blockchain can be referred to as publishing the copyright-related information to the blockchain. Here, the blockchain may refer to a blockchain network comprising one or more blockchain nodes. Each blockchain node may comprise or be referred to as a node device in the blockchain.

After the copyright-related information corresponding to the original image is obtained, as the copyright-related information contains a lot of content, the copyright-related information may be compressed so as to be embedded into the original image. For example, in the embodiments of the specification, the compression of the copyright-related information may be achieved through encryption.

In an embodiment, the copyright-related information may be sent to one or more blockchain nodes of a blockchain, and a node device in the blockchain may encrypt the copyright-related information. Through the encryption, the copyright-related information may be converted into a ciphertext string, and store the ciphertext string in the blockchain, thereby achieving the compression of the copyright-related information.

Herein, a Hash encryption algorithm may be used for the encryption of the copyright-related information. Namely, Hash conversion is performed on the copyright-related information to obtain a Hash value corresponding to the copyright-related information. Other encryption algorithms may also be used for the encryption of the copyright-related information.

Moreover, in the embodiments of the specification, by uploading the copyright-related information to the blockchain for encryption, the authenticity of the copyright-related information can be ensured due to the immutability of the blockchain, which may achieve unique tracking of the copyright when copyright infringement occurs later.

In Step 106, the ciphertext information is obtained from the blockchain.

In Step 108, a pixel matrix of the original image is obfuscated based on the ciphertext information to generate a target image carrying the copyright-related information.

In the embodiments of the specification, the obfuscation of the pixel matrix of the original image based on the ciphertext information may be embedding the ciphertext information into the pixel matrix. In this way, the new image (i.e., a target image) obtained from the processing carries the copyright-related information of the image. When the image is plagiarized, copyright protection may be achieved through the copyright-related information carried in the image.

In an embodiment, in the above-described Step 106, the obfuscation of a pixel matrix of the original image based on the ciphertext information may at least comprise the following two embodiments.

Embodiment I

The ciphertext information is encoded to obtain a binary string corresponding to the ciphertext information, and the binary string is inserted into the pixel matrix according to a set inserting rule.

For example, an encoding manner may be used to convert the ciphertext information into a binary string, i.e., a string consisting of a series of characters 0 and 1, and this string is inserted into the pixel matrix of the original image.

Figures 2, 3A:
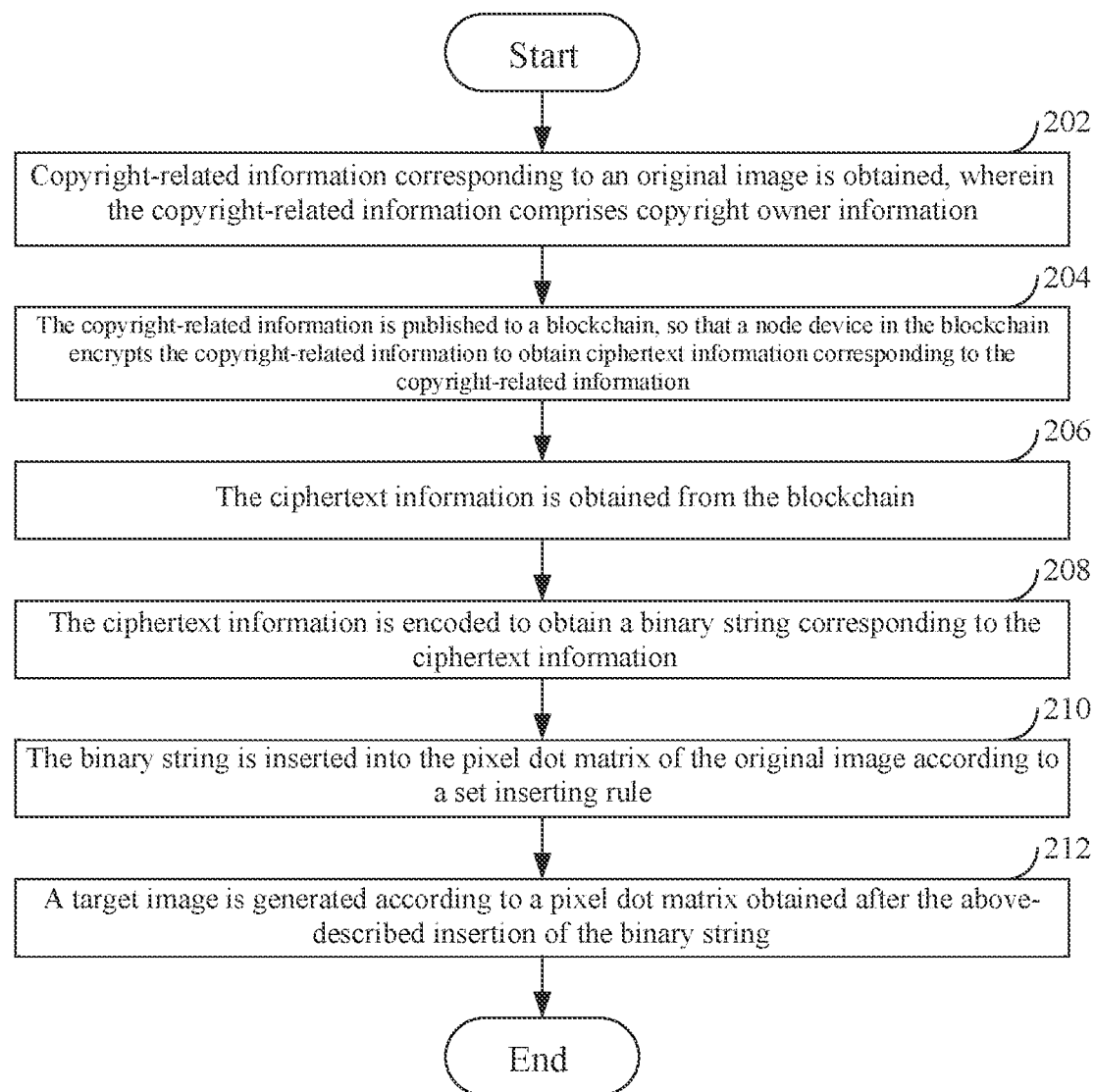
FIG. 2 is a second flow chart of the blockchain-based image processing method according to some embodiments of the specification.
FIG. 3(a) is a diagram of a pixel matrix of an original image in the blockchain-based image processing method according to some embodiments of the specification.

FIG. 2 is a second flow chart of the blockchain-based image processing method according to some embodiments of the specification. The method shown in FIG. 2 at least comprises the following steps.

In Step 202, copyright-related information corresponding to an original image is obtained, wherein the copyright-related information comprises copyright owner information.

In Step 204, the copyright-related information is sent to a blockchain, so that a node device in the blockchain can encrypt the copyright-related information to obtain ciphertext information corresponding to the copyright-related information and store the ciphertext information in the blockchain. Here, the blockchain may refer to a blockchain network comprising one or more blockchain nodes. Each blockchain node may comprise or be referred to as a node device in the blockchain.

In Step 206, the ciphertext information is obtained from the blockchain.

In Step 208, the ciphertext information is encoded to obtain a binary string corresponding to the ciphertext information.

In Step 210, the binary string is inserted into the pixel matrix of the original image according to a set inserting rule.

In Step 212, a target image is generated according to a pixel matrix obtained after the above-described insertion of the binary string.

In this way, the obtained target image is an image embedded with the copyright-related information of the original image. By embedding the copyright-related information into the pixel matrix of the image, it becomes more difficult for a person who plagiarizes the image to eliminate or tamper with the copyright-related information, thereby facilitating the copyright protection for the image.

In some embodiments, in the above-described Embodiment I, the inserting, according to a set inserting rule, the binary string into the pixel matrix may be implemented in at least one of the following manners:

inserting at least one character in the binary string into the pixel matrix according to a set character spacing;

dividing the pixel matrix into a plurality of pixel regions according to a set dividing rule, and inserting the binary string into at least one designated pixel region; and dividing the pixel matrix into a plurality of pixel regions according to a set dividing rule, and inserting a part or a portion of characters in the binary string into each of the pixel regions.

For ease of understanding, the above-described various embodiments will be described one by one in the following examples.

In the above description, inserting at least one character in the binary string according to a set character spacing may start at any position of the pixel matrix. One character in the binary string may be inserted at a set character spacing, such as two pixels, three pixels, etc.

Figures 3B, 3C, 3D:
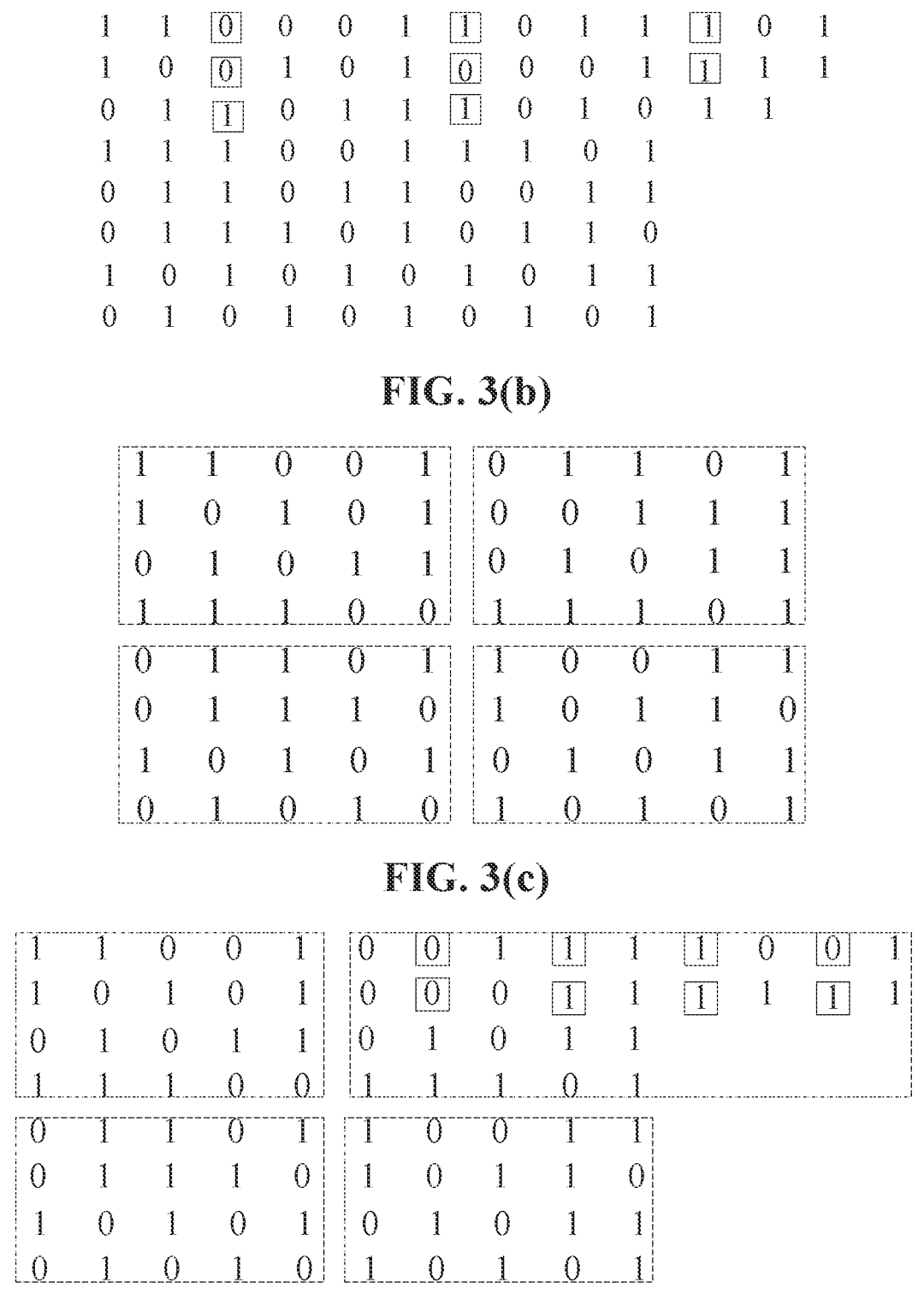

For example, in an embodiment, the pixel matrix corresponding to the original image is 8*10, i.e., the pixel matrix comprises 8 rows of pixels and 10 columns of pixels, as shown in FIG. 3(a). The binary string obtained according to the copyright-related information of the original image is 01100111. Starting from the third pixel of each row of the pixels, one binary character may be inserted every three pixels. A diagram of the pixel matrix obtained after the insertion is shown in FIG. 3(b). In FIG. 3(b), to facilitate viewing at which positions the binary characters are inserted, boxes are used to mark the inserted binary characters in the diagram. Inserted binary characters do not need to be marked with boxes in practical applications. Finally, an image is generated based on the pixel matrix shown in FIG. 3(b), i.e., a target image corresponding to the original image is obtained, and the target image carries the copyright-related information.

In some other embodiments, the pixel matrix of the original image may also be divided into a plurality of pixel regions, and the binary string may be inserted into one or more of the pixel regions.

For example, the pixel matrix shown in FIG. 3(a) is divided into four pixel regions, as shown in FIG. 3(c). The binary string may be inserted into one of the pixel regions, e.g., inserted into the second pixel region. A binary string obtained based on the copyright-related information of the original image is 01100111, and the binary string may be inserted into the second pixel region of the pixel matrix according to a set inserting rule (e.g., inserting one binary string every other pixel starting from the second pixel of each row of the pixels). The diagram of the pixel matrix obtained after the insertion is shown in FIG. 3(d).

In addition to the insertion of a whole binary string into one or more of the pixel regions, the above-described binary string may also be divided and inserted into all the pixel regions. Namely, a portion of or several binary characters in the binary string are inserted into each of the pixel regions.

For example, with respect to the pixel matrix shown in FIG. 3(c) (the pixel matrix is divided into four pixel regions), a binary string obtained based on the copyright-related information of the original image is 01100111, and the string 01100111 may be distributed into the four pixel regions. For example, the string may be distributed evenly or may be distributed randomly. For example, 01 may be inserted into the first pixel region, 10 may be inserted into the second pixel region, 01 may be inserted into the third pixel region, and 11 may be inserted into the fourth pixel region. The same inserting rule or different inserting rules may be applied in each of the pixel regions. In some embodiments, for all the pixel regions, one binary character is inserted every other pixel starting from the second pixel of each row of the pixels, and the pixel matrix obtained after the insertion is as shown in FIG. 3(e).

Several embodiments of inserting a binary string into a pixel matrix are described above. In addition, other embodiments may also be used to insert a binary string into the pixel matrix of the original image. Any embodiment of inserting a binary string into a pixel matrix may be used in the embodiments of the specification, which will not be enumerated in the embodiments of the specification.

In the embodiments of the specification, by inserting binary characters in a binary string into a pixel matrix corresponding to the original image according to a set inserting rule, the arrangement of pixels in the pixel matrix corresponding to the original image changes. Moreover, some new pixels are inserted. When this image is used without authorization, it becomes more difficult for the unauthorized user to eliminate or tamper with the copyright-related information corresponding to the image, thereby achieving the copyright protection for the image.

Embodiment II

The ciphertext information is encoded to obtain a binary string corresponding to the ciphertext information, and the binary string is used to replace redundant pixels in the pixel matrix according to a set replacing rule.

Some redundant pixels may typically exist in the pixel matrix of an image. Therefore, in the embodiments of the specification, the binary characters in the binary string may be directly used to replace redundant pixels in the pixel matrix.

In an embodiment, if the number of redundant pixels is equal to the number of binary characters in the binary string, the binary characters in the binary string may be directly used to sequentially replace redundant pixels in the pixel matrix. If the number of redundant pixels is greater than the number of binary characters in the binary string, a number of redundant pixels equal to the number of binary characters in the binary string may be selected, and each of the binary characters in the binary string is used to respectively replace each of the selected redundant pixels. If the number of redundant pixels is less than the number of binary characters in the binary string, the same number of binary characters may be used to replace the redundant pixels, while the remaining binary characters may be inserted into the pixel matrix according to a set rule.

Several potential situations are listed above. However, replacing redundant pixels in a pixel matrix with binary characters may be performed in other suitable manners.

Figure 4:
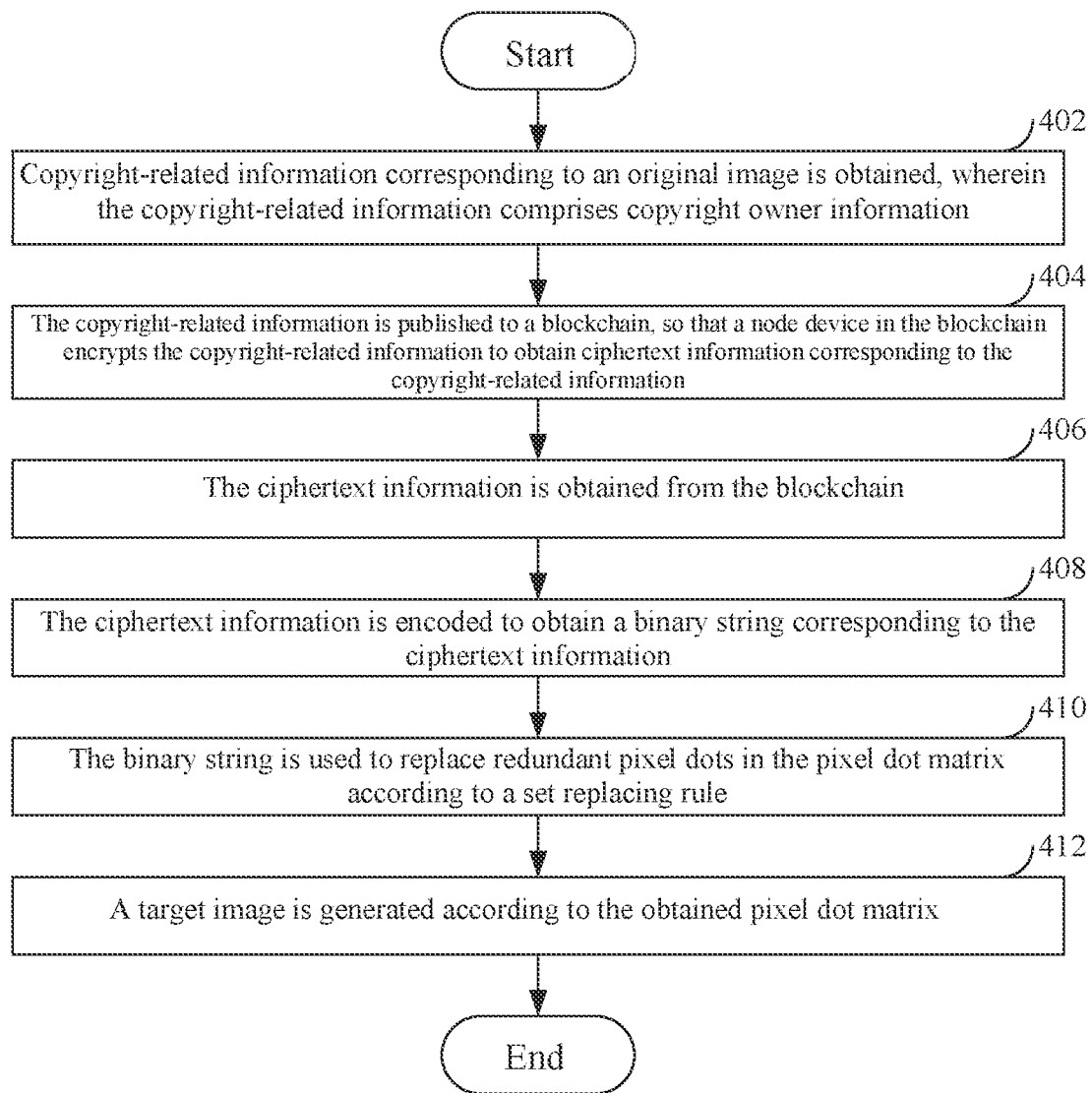
FIG. 4 is a third flow chart of the blockchain-based image processing method according to some embodiments of the specification.

FIG. 4 is a third flow chart of the blockchain-based image processing method according to some embodiments of the specification. The method shown in FIG. 4 at least comprises the following steps.

In Step 402, copyright-related information corresponding to an original image is obtained, wherein the copyright-related information comprises copyright owner information.

In Step 404, the copyright-related information is published to a blockchain, so that a node device in the blockchain encrypts the copyright-related information to obtain ciphertext information corresponding to the copyright-related information, and store the ciphertext information in the blockchain.

In Step 406, the ciphertext information is obtained from the blockchain.

In Step 408, the ciphertext information is encoded to obtain a binary string corresponding to the ciphertext information.

In Step 410, the binary string is used to replace redundant pixels in the pixel matrix according to a set replacing rule.

In Step 412, a target image is generated according to the obtained pixel matrix.

In the embodiments of the specification, by using binary characters in a binary string to replace redundant pixels in the pixel matrix corresponding to the original image, the arrangement of pixels in the pixel matrix corresponding to the original image changes. When this image is used without authorization, it becomes more difficult for the unauthorized user to eliminate or tamper with the copyright-related information corresponding to the image, thereby achieving the copyright protection for the image.

In addition, in the embodiments of the specification, to facilitate viewing changes to the pixel matrix of the original image, after the above-described obfuscation of the pixel matrix of the original image based on the ciphertext information, the method according to the embodiments of the specification further comprises the following steps recording information of the process of performing obfuscation on the pixel matrix, and sending the process information to the one or more blockchain nodes in the blockchain for storing in the blockchain.

In an embodiment, if the binary string corresponding to the ciphertext information is inserted into the pixel matrix according to a set inserting rule, the above-described process information may record the binary string converted from the ciphertext information and positions in the pixel matrix at which all the binary characters in the binary string are inserted.

If the binary string corresponding to the ciphertext information is used to replace redundant pixels in the pixel matrix according to a set replacing rule, the above-described process information may record the binary string corresponding to the ciphertext information and positions at which all the binary characters in the binary string replace the redundant pixels.

Figure 5:
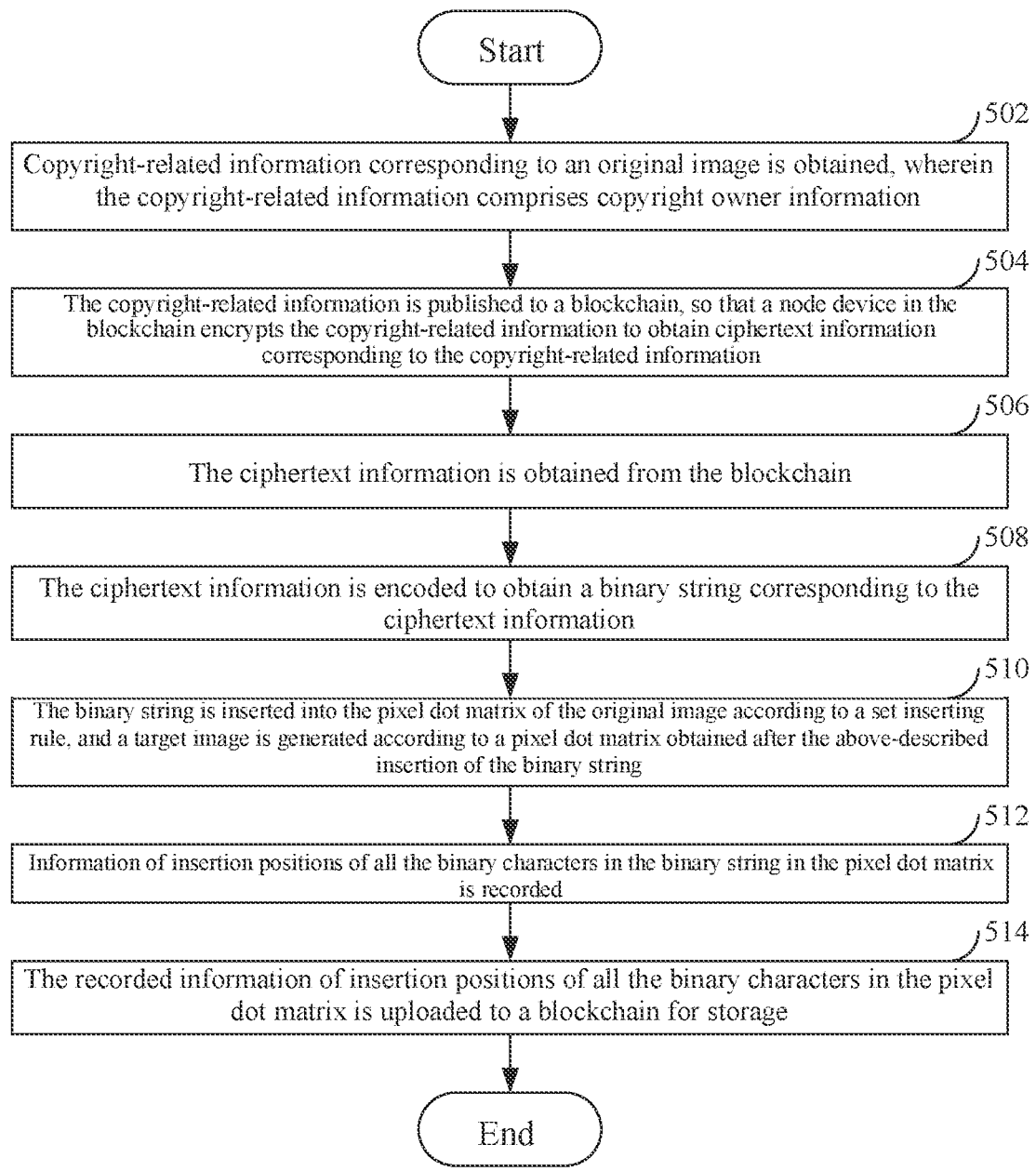
FIG. 5 is a fourth flow chart of the blockchain-based image processing method according to some embodiments of the specification.

For ease of understanding, the embodiments of the specification will be described below according to the above-described example of inserting the binary string into the pixel matrix according to a set inserting rule. FIG. 5 is a fourth flow chart of the blockchain-based image processing method according to some embodiments of the specification. The method shown in FIG. 5 at least comprises the following steps.

In Step 502, copyright-related information corresponding to an original image is obtained, wherein the copyright-related information comprises copyright owner information.

In Step 504, the copyright-related information is published to a blockchain, so that a node device in the blockchain encrypts the copyright-related information to obtain ciphertext information corresponding to the copyright-related information and stores the ciphertext information in the blockchain.

In Step 506, the ciphertext information is obtained from the blockchain.

In Step 508, the ciphertext information is encoded to obtain a binary string corresponding to the ciphertext information.

In Step 510, the binary string is inserted into the pixel matrix of the original image according to a set inserting rule, and a target image is generated according to a pixel matrix obtained after the above-described insertion of the binary string.

In Step 512, information of insertion positions of all the binary characters in the binary string in the pixel matrix is recorded.

In Step 514, the recorded information of insertion positions of all the binary characters in the pixel matrix is uploaded to a blockchain for storage.

In addition, in the embodiments of the specification, the copyright-related information may further comprise at least one piece of the following information, current time information, current geographic location information, and identification information of a computing device (i.e., a blockchain-based image processing device being currently used.)

In the embodiments of the specification, in addition to the copyright owner information, the copyright-related information may further comprise any combination of the above-described information. In addition, the copyright-related information may also comprise other information, which will not be elaborated in the embodiments of the specification.

For example, the current time information may be a time when the original image is processed, the current geographic location information may be information of a current geographic location positioned by the blockchain-based image processing device when the original image is processed, and the identification information of a blockchain-based image processing device being currently used may be information like an Internet Protocol (IP) address and/or a Media Access Control (MAC) address of the blockchain-based image processing device used when the original image is processed.

In the embodiments of the specification, the current time information, current geographic location information, and identification information of the device being used are all taken into account. In this way, when a copyright infringement event occurs, infringement determination may be made with assistance from the above-described information, thereby further safeguarding the copyright security of the user.

Figure 6:
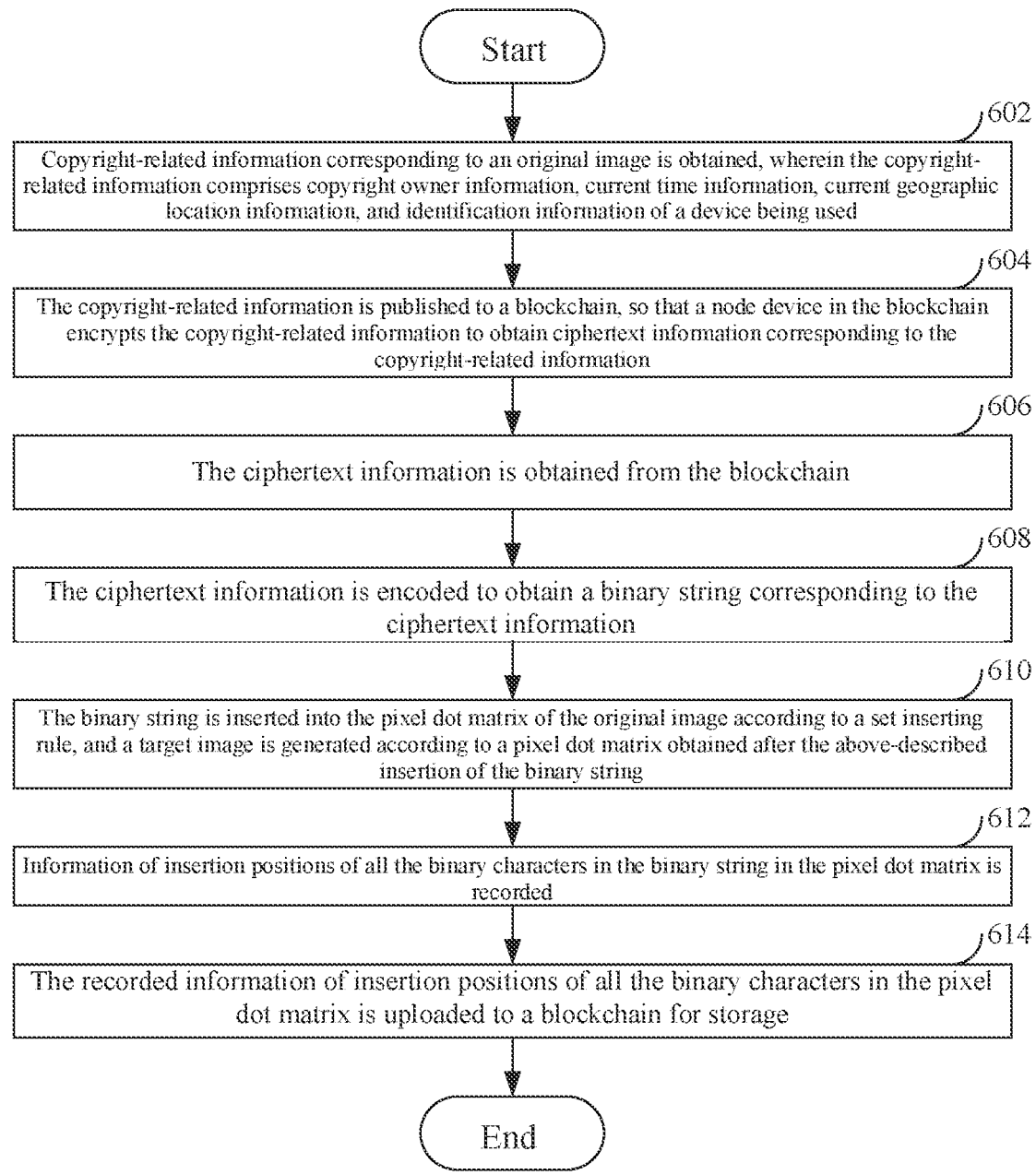
FIG. 6 is a fifth flow chart of the blockchain-based image processing method according to some embodiments of the specification.

FIG. 6 is a fifth flow chart of the blockchain-based image processing method according to some embodiments of the specification. The method shown in FIG. 6 comprises the following steps.

In Step 602, copyright-related information of an original image is obtained, wherein the copyright-related information comprises copyright owner information, current time information, current geographic location information, and identification information of a device being used.

In Step 604, the copyright-related information is published to a blockchain, so that a node device in the blockchain encrypts the copyright-related information to obtain ciphertext information corresponding to the copyright-related information and stores the ciphertext information in the blockchain.

In Step 606, the ciphertext information is obtained from the blockchain.

In Step 608, the ciphertext information is encoded to obtain a binary string corresponding to the ciphertext information.

In Step 610, the binary string is inserted into the pixel matrix of the original image according to a set inserting rule, and a target image is generated according to a pixel matrix obtained after the above-described insertion of the binary string.

In Step 612, information of insertion positions of all the binary characters in the binary string in the pixel matrix is recorded.

In Step 614, the recorded information of insertion positions of all the binary characters in the pixel matrix is uploaded to a blockchain for storage.

Figure 7:
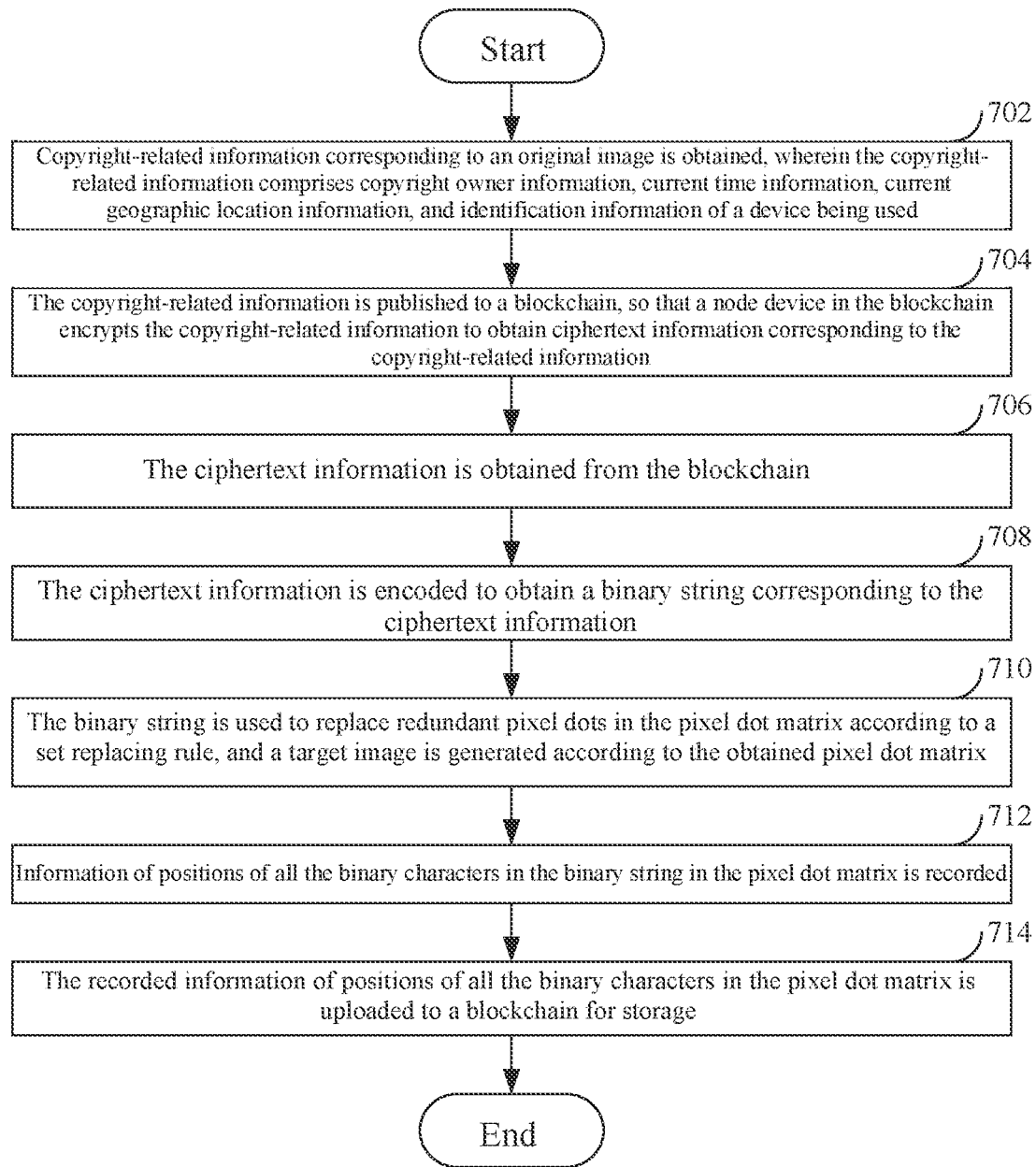
FIG. 7 is a sixth flow chart of the blockchain-based image processing method according to some embodiments of the specification.

FIG. 7 is a sixth flow chart of the blockchain-based image processing method according to some embodiments of the specification. The method shown in FIG. 7 comprises the following steps.

In Step 702, copyright-related information of an original image is obtained, wherein the copyright-related information comprises copyright owner information, current time information, current geographic location information, and identification information of a device being used.

In Step 704, the copyright-related information is published to a blockchain, so that a node device in the blockchain encrypts the copyright-related information to obtain ciphertext information corresponding to the copyright-related information and stores the ciphertext information in the blockchain.

In Step 706, the ciphertext information is obtained from the blockchain.

In Step 708, the ciphertext information is encoded to obtain a binary string corresponding to the ciphertext information.

In Step 710, the binary string is used to replace redundant pixels in the pixel matrix according to a set replacing rule, and a target image is generated according to the obtained pixel matrix.

In Step 712, information of positions of all the binary characters in the binary string in the pixel matrix is recorded.

In Step 714, the recorded information of positions of all the binary characters in the pixel matrix is uploaded to a blockchain for storage.

The blockchain-based image processing method according to some embodiments of the specification obfuscates a pixel matrix of an original image based on copyright-related information of the original image, so that a generated target image carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

Figure 8:
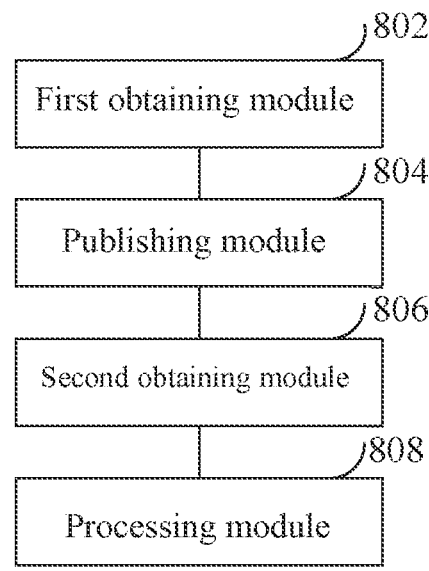
FIG. 8 is a schematic diagram of modules of a blockchain-based image processing apparatus according to some embodiments of the specification.

Corresponding to the method according to some embodiments of the specification, the embodiments of the specification further provide, based on the same concept, a blockchain-based image processing apparatus configured to implement the method according to the embodiments shown in FIG. 1 to FIG. 7 in the specification. FIG. 8 is a schematic diagram of modules of a blockchain-based image processing apparatus according to some embodiments of the specification. The apparatus shown in FIG. 8 comprises: a first obtaining module 802 configured to obtain copyright-related information corresponding to an original image, wherein the copyright-related information comprises copyright owner information; a publishing module 804 configured to send the copyright-related information to one or more blockchain nodes of a blockchain, so that one or more blockchain nodes encrypt the copyright-related information to obtain ciphertext information corresponding to the copyright-related information and stores the ciphertext information in the blockchain; a second obtaining module 806 configured to obtain the ciphertext information from the blockchain; and a processing module 808 configured to obfuscate, based on the ciphertext information, on a pixel matrix of the original image to generate a target image carrying the copyright-related information.

In an embodiment, the processing module 808 comprises: a first encoding unit configured to encode the ciphertext information to obtain a binary string corresponding to the ciphertext information; and an inserting unit configured to insert, according to a set inserting rule, the binary string into the pixel matrix.

In an embodiment, the inserting unit comprises any one of the following sub-units: a first executing sub-unit configured to insert at least one character in the binary string into the pixel matrix according to a set character spacing; or a second executing sub-unit configured to divide the pixel matrix into a plurality of pixel regions according to a set dividing rule, and insert the binary string into at least one designated pixel region; or a third executing sub-unit configured to divide the pixel matrix into a plurality of pixel regions according to a set dividing rule, and insert a part or a portion of characters in the binary string into each of the pixel regions.

In an embodiment, the processing module 808 comprises: a second encoding unit configured to encode the ciphertext information to obtain a binary string corresponding to the ciphertext information; and a replacing unit configured to use the binary string to replace redundant pixels in the pixel matrix according to a set replacing rule.

In an embodiment, the apparatus according to some embodiments of the specification further comprises: a recording module configured to record information of the process of obfuscation of the pixel matrix; and a storing module configured to store the process information to the blockchain.

In an embodiment, the copyright-related information further comprises at least one piece of the following information: current time information, current geographic location information, and identification information of a blockchain-based image processing device being currently used.

In an embodiment, the copyright owner information comprises: a name of the copyright owner and an ID number of the copyright owner.

The blockchain-based image processing apparatus according to some embodiments of the specification may further implement the method implemented by the blockchain-based image processing apparatus according to FIG. 1 to FIG. 7, and achieve functions of the blockchain-based image processing apparatus according to the embodiments shown in FIG. 1 to FIG. 7, which will not be elaborated in the embodiments of the specification.

The blockchain-based image processing apparatus according to some embodiments of the specification obfuscates a pixel matrix of an original image based on copyright-related information of the original image, so that a generated target image carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

Figure 9:
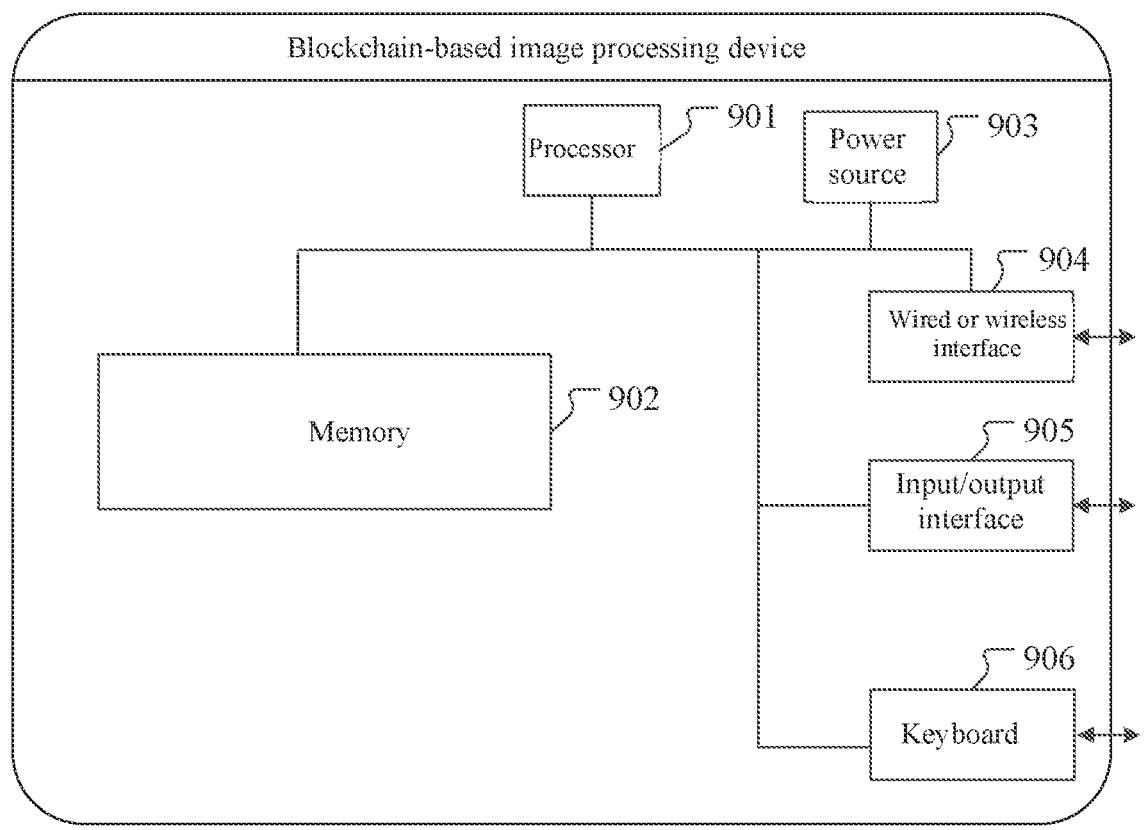
FIG. 9 is a schematic structural diagram of a blockchain-based image processing device according to some embodiments of the specification.

Furthermore, based on the method shown in FIG. 1 to FIG. 7, the embodiments of the specification further provide a blockchain-based image processing device as shown in FIG. 9.

The blockchain-based image processing device may vary significantly due to different configurations or performance, and may comprise one or more processors 901 and memories 902. The memory 902 may store one or more stored applications or data, wherein the memory 902 may achieve transient storage or persistent storage. An application stored in the memory 902 may comprise one or more modules (not shown), and each module may comprise information of a series of computer executable instructions in the blockchain-based image processing device. Furthermore, the processor 901 may be configured to communicate with the memory 902 and execute the information of a series of computer executable instructions in the memory 902 on the blockchain-based image processing device. The blockchain-based image processing device may further comprise one or more power sources 903, one or more wired or wireless network interfaces 904, one or more input/output interfaces 905, one or more keyboards 906, etc.

In an embodiment, the blockchain-based image processing device comprises a memory and one or more programs, wherein the one or more programs are stored in the memory, the one or more programs may comprise one or more modules, and each module may comprise information of a series of computer executable instructions in the blockchain-based image processing device and may be configured to execute the one or more programs by one or more processors, comprising performing the following computer executable instruction information: obtaining copyright-related information corresponding to an original image, wherein the copyright-related information comprises copyright owner information; sending the copyright-related information to one or more blockchain nodes of a blockchain, so that one or more blockchain nodes encrypt the copyright-related information to obtain ciphertext information corresponding to the copyright-related information, and store the ciphertext information in the blockchain; obtaining the ciphertext information from the blockchain; and performing obfuscation on a pixel matrix of the original image based on the ciphertext information to generate a target image carrying the copyright-related information.

In an embodiment, when the computer executable instruction information is executed, the obfuscation on a pixel matrix of the original image based on the ciphertext information comprises: encoding the ciphertext information to obtain a binary string corresponding to the ciphertext information; and inserting, according to a set inserting rule, the binary string into the pixel matrix.

In an embodiment, when the computer executable instruction information is executed, the inserting, according to a set inserting rule, the binary string into the pixel matrix comprises any one of the following: inserting at least one character in the binary string into the pixel matrix according to a set character spacing; or dividing the pixel matrix into a plurality of pixel regions according to a set dividing rule, and inserting the binary string into at least one designated pixel region; or dividing the pixel matrix into a plurality of pixel regions according to a set dividing rule, and inserting a part or a portion of characters in the binary string into each of the pixel regions.

In an embodiment, when the computer executable instruction information is executed, the obfuscation on a pixel matrix of the original image based on the ciphertext information comprises: encoding the ciphertext information to obtain a binary string corresponding to the ciphertext information; and using the binary string to replace redundant pixels in the pixel matrix according to a set replacing rule.

In an embodiment, when the computer executable instruction information is executed, after the obfuscation on a pixel matrix of the original image based on the ciphertext information to generate a target image carrying the copyright-related information, the following steps may be further executed: recording information of the process of obfuscation on the pixel matrix; and storing the process information to the blockchain.

In an embodiment, when the computer executable instruction information is executed, the copyright-related information further comprises at least one piece of the following information: current time information, current geographic location information, and identification information of a blockchain-based image processing device being currently used.

In an embodiment, when the computer executable instruction information is executed, the copyright owner information comprises a name of the copyright owner and an ID number of the copyright owner.

The blockchain-based image processing device according to some embodiments of the specification performs obfuscation on a pixel matrix of an original image based on copyright-related information of the original image, so that a generated target image carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

Furthermore, based on the method shown in FIG. 1 to FIG. 7, the embodiments of the specification further provide a storage medium configured to store computer executable instruction information. In an embodiment, the storage medium may be a USB flash drive, a CD, a hard drive, and the like. The computer executable instruction information stored in the storage medium may, when being executed by a processor, implement the following process of: obtaining copyright-related information corresponding to an original image, wherein the copyright-related information comprises copyright owner information; sending the copyright-related information to one or more blockchain nodes of a blockchain, so that one or more blockchain nodes encrypt the copyright-related information to obtain ciphertext information corresponding to the copyright-related information, and store the ciphertext information in the blockchain; obtaining the ciphertext information from the blockchain; and performing obfuscation on a pixel matrix of the original image based on the ciphertext information to generate a target image carrying the copyright-related information.

In an embodiment, when the computer executable instruction information stored in the storage medium is executed by a processor, performing obfuscation on a pixel matrix of the original image based on the ciphertext information comprises: encoding the ciphertext information to obtain a binary string corresponding to the ciphertext information; and inserting, according to a set inserting rule, the binary string into the pixel matrix.

In an embodiment, when the computer executable instruction information stored in the storage medium is executed by a processor, inserting the binary string into the pixel matrix, according to a set inserting rule comprises any one of the following methods: inserting at least one character in the binary string into the pixel matrix according to a set character spacing; or dividing the pixel matrix into a plurality of pixel regions according to a set dividing rule, and inserting the binary string into at least one designated pixel region; or dividing the pixel matrix into a plurality of pixel regions according to a set dividing rule, and inserting a part of characters in the binary string into each of the pixel regions.

In an embodiment, when the computer executable instruction information stored in the storage medium is executed by a processor, performing obfuscation on a pixel matrix of the original image based on the ciphertext information comprises: encoding the ciphertext information to obtain a binary string corresponding to the ciphertext information; and using the binary string to replace redundant pixels in the pixel matrix according to a set replacing rule.

In an embodiment, when the computer executable instruction information stored in the storage medium is executed by a processor, after performing obfuscation on a pixel matrix of the original image based on the ciphertext information to generate a target image carrying the copyright-related information, the following steps may be further executed: recording information of the process of obfuscation on the pixel matrix, and storing the process information to the blockchain.

In an embodiment, when the computer executable instruction information stored in the storage medium is executed by a processor, the copyright-related information further comprises at least one piece of the following information: current time information, current geographic location information, and identification information of a blockchain-based image processing device being currently used.

In an embodiment, when the computer executable instruction information stored in the storage medium is executed by a processor, the copyright owner information at least comprises: a name of the copyright owner and an ID number of the copyright owner.

When the computer executable instruction information stored in the storage medium according to some embodiments of the specification is executed by a processor, a pixel matrix of an original image is obfuscated based on copyright-related information of the original image, so that a generated target image carries the copyright-related information. In this way, when the image is plagiarized, tracking may be performed based on the copyright-related information in the pixel matrix to protect the copyright of the image. Moreover, since it is the pixel matrix of the original image that has been processed, it becomes more difficult for a person who plagiarizes the image to eliminate or tamper with the copyright-related information in the image, which further improves the security of the image copyright. In addition, in the embodiments of the specification, the copyright-related information of the image is encrypted in a blockchain, and the pixel matrix of the original image is obfuscated using ciphertext information obtained from the encryption, which may achieve unique tracking of the image copyright due to the immutability of the blockchain, thereby further safeguarding the security of the image copyright.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

In the 1990s, an improvement to a technology can be differentiated into a hardware improvement (e.g., an improvement to a circuit structure, such as a diode, a transistor, a switch, etc.) or a software improvement (an improvement to a flow of a method). With the technological development, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized with a hardware module. For example, Programmable Logic Device (PLD) (e.g., Field Programmable Gate Array (FPGA)) is such integrated circuit of which logic functions are determined by a user through programming the device. A designer programs on his/her own to "integrate" a digital system onto one piece of PLD, who does not need to request a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also be aware that it would be very easy to obtain a hardware circuit to implement a logic method flow by using the above HDLs to carry out a little bit logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) capable of being executed by the (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, an embedded microcontroller, etc. Therefore, such controller may be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented, for example, by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any of these devices.

For convenience of description, the above apparatus is divided into various units according to functions for description. Functions of the units may be implemented in one or more pieces of software and/or hardware when the specification is implemented.

One of ordinary skill in the art should understand that the embodiments of the specification may be provided as a method, a system, or a computer program product. Therefore, the specification may be implemented as a complete hardware embodiment, a complete software embodiment, or an embodiment combing software and hardware. Moreover, the specification may be in the form of a computer program product implemented on one or more computer usable storage media (including, but not limited to, a magnetic disk memory, CD-ROM, an optical memory, etc.) comprising computer usable program codes.

The specification is described with reference to flowcharts and/or block diagrams of the method, device (system), and computer program product according to the embodiments of the specification. It should be understood that computer program instruction information may be used to implement each process and/or block in the flowcharts and/or block diagrams and a combination of processes and/or blocks in the flowcharts and/or block diagrams. The computer program instruction information may be provided for a general-purpose computer, a special-purpose computer, an embedded processor, or a processor of other programmable data processing devices to generate a machine, causing instruction information executed by a computer or a processor of other programmable data processing devices to generate an apparatus for implementing a function specified in one or more processes in the flowcharts and/or in one or more blocks in the block diagrams.

The computer program instruction information may also be stored in a computer readable memory that can instruct a computer or other programmable data processing devices to work in a particular manner, causing the instruction information stored in the computer readable memory to generate a manufactured article that includes an instruction information apparatus. The instruction information apparatus implements a function specified in one or more processes in the flowcharts and/or in one or more blocks in the block diagrams.

The computer program instruction information may also be loaded onto a computer or other programmable data processing devices, causing a series of operational steps to be performed on the computer or other programmable devices, thereby generating computer-implemented processing. Therefore, the instruction information executed on the computer or other programmable devices provides steps for implementing a function specified in one or more processes in the flowcharts and/or in one or more blocks in the block diagrams.

In a typical configuration, a computation device includes one or more processors (CPUs), input/output interfaces, network interfaces, and a memory.

The memory may include computer readable media, such as a volatile memory, a Random-Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instruction information, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

It should be further noted that the terms of "including," "comprising" or any other variants of the terms are intended to encompass a non-exclusive inclusion, causing a process, method, product, or device comprising a series of elements to not only comprise these elements, but also comprise other elements that are not clearly listed, or further comprise elements that are inherent to the process, method, product, or device. When there is no further restriction, elements defined by the statement "comprising one . . . " does not exclude that a process, method, product, or device comprising the above elements further comprises additional identical elements.

One of ordinary skill in the art should understand that the embodiments of the specification may be provided as a method, a system, or a computer program product. Therefore, the specification may be implemented as a complete hardware embodiment, a complete software embodiment, or an embodiment combing software and hardware. Moreover, the specification may be in the form of a computer program product implemented on one or more computer usable storage media (including, but not limited to, a magnetic disk memory, CD-ROM, an optical memory, etc.) comprising computer usable program codes.

The specification may be described in a regular context of a computer executable instruction information that is executed by a computer, such as a program module. Generally, the program module comprises a routine, a program, an object, a component, a data structure, etc. for executing a particular task or implementing a particular abstract data type. The specification may also be practiced in distributed computing environments. In these distributed computing environments, remote processing devices connected via communication networks carry out tasks. In the distributed computing environments, a program module may be located in local and remote computer storage media, including storage devices.

The embodiments in the specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for related parts.

The above-described is only embodiments of the specification, which are not used to limit the specification. To one of ordinary skill in the art, the specification may have various modifications and changes. Any modification, equivalent substitution, or improvement made within the spirit and principle of the specification shall be encompassed by the claims of the specification.

What is claimed is:

1. A blockchain-based image processing method, comprising:
    obtaining, by a computing device, copyright-related information corresponding to an original image;
    sending, by the computing device, the copyright-related information to one or more blockchain nodes configured to obtain ciphertext information by encrypting the copyright-related information and to store the ciphertext information in the blockchain;
    obtaining, by the computing device, the ciphertext information from the blockchain; and
    performing, by the computing device, obfuscation on a pixel matrix of the original image based on the ciphertext information to generate a target image carrying the copyright-related information, by:
        encoding the ciphertext information to obtain a binary string corresponding to the ciphertext information;
        inserting at least one character of the binary string into the pixel matrix according to a set character spacing; and
        dividing the pixel matrix into a plurality of pixel regions according to a set dividing rule, and inserting the binary string into at least one of the pixel regions; or
        dividing the pixel matrix into a plurality of pixel regions according to a set dividing rule, and inserting a portion of the binary string into each of the pixel regions.

2. The method of claim 1, wherein the performing obfuscation on a pixel matrix of the original image based on the ciphertext information further comprises:
    using the binary string to replace redundant pixels in the pixel matrix according to a set replacing rule.

3. The method of claim 1, further comprising:
    recording process information of performing obfuscation on the pixel matrix; and
    sending the process information to the one or more blockchain nodes for storing in the blockchain.

4. The method of claim 1, wherein the copyright-related information further comprises:
    current time information;
    current geographic location information; or
    identification information of the computing device.

5. The method of claim 1, wherein the copyright-related information further comprises copyright owner information of a copyright owner corresponding to the original image, wherein the copyright owner information comprises:
    a name of the copyright owner; or
    an ID number of the copyright owner.

6. A blockchain-based image processing system, comprising a processor and a non-transitory computer-readable storage medium storing instructions executable by the processor to cause the system to perform operations comprising:
    obtaining copyright-related information corresponding to an original image;
    sending the copyright-related information to one or more blockchain nodes configured to obtain ciphertext information by encrypting the copyright-related information and to store the ciphertext information in the blockchain;

obtaining the ciphertext information from the blockchain; and performing obfuscation on a pixel matrix of the original image based on the ciphertext information to generate a target image carrying the copyright-related information, by:

encoding the ciphertext information to obtain a binary string corresponding to the ciphertext information;

inserting at least one character of the binary string into the pixel matrix according to a set character spacing; and dividing the pixel matrix into a plurality of pixel regions according to a set dividing rule, and inserting the binary string into at least one of the pixel regions; or dividing the pixel matrix into a plurality of pixel regions according to a set dividing rule, and inserting a portion of the binary string into each of the pixel regions.

7. The system of claim 6, wherein the performing obfuscation on a pixel matrix of the original image based on the ciphertext information further comprises:

using the binary string to replace redundant pixels in the pixel matrix according to a set replacing rule.

8. The system of claim 6, wherein the operations further comprise:

recording process information of performing obfuscation on the pixel matrix; and sending the process information to the one or more blockchain nodes for storing in the blockchain.

9. The system of claim 6, wherein the copyright-related information further comprises:

current time information;

current geographic location information; or identification information of the computing device.

10. The system of claim 6, wherein the copyright-related information further comprises copyright owner information of a copyright owner corresponding to the original image, wherein the copyright owner information comprises:

a name of the copyright owner; or an ID number of the copyright owner.

11. A non-transitory computer-readable storage medium for blockchain-based image processing, configured with instructions executable by one or more processors to cause the one or more processors to perform operations comprising:

obtaining copyright-related information corresponding to an original image;

sending the copyright-related information to one or more blockchain nodes configured to obtain ciphertext information by encrypting the copyright-related information and to store the ciphertext information in the blockchain;

obtaining the ciphertext information from the blockchain; and performing obfuscation on a pixel matrix of the original image based on the ciphertext information to generate a target image carrying the copyright-related information, by:

encoding the ciphertext information to obtain a binary string corresponding to the ciphertext information;

inserting at least one character of the binary string into the pixel matrix according to a set character spacing; and dividing the pixel matrix into a plurality of pixel regions according to a set dividing rule, and inserting the binary string into at least one of the pixel regions; or dividing the pixel matrix into a plurality of pixel regions according to a set dividing rule, and inserting a portion of the binary string into each of the pixel regions.

12. The storage medium of claim 11, wherein the performing obfuscation on a pixel matrix of the original image based on the ciphertext information further comprises:

using the binary string to replace redundant pixels in the pixel matrix according to a set replacing rule.

13. The storage medium of claim 11, wherein the operations further comprise:

recording process information of performing obfuscation on the pixel matrix; and sending the process information to the one or more blockchain nodes for storing in the blockchain.

14. The storage medium of claim 11, wherein the copyright-related information further comprises:

current time information;

current geographic location information; or identification information of the computing device.

15. The storage medium of claim 11, wherein the copyright-related information further comprises copyright owner information of a copyright owner corresponding to the original image, wherein the copyright owner information comprises:

a name of the copyright owner; or an ID number of the copyright owner.

* * * * *